United States Patent [19]
Pradel

[11] Patent Number: 5,975,586
[45] Date of Patent: Nov. 2, 1999

[54] CONNECTION DEVICE FOR CONNECTING A LIQUID OR GASEOUS MEDIUM THROUGH AN OUTER WALL OF A CYLINDER

[75] Inventor: Robert Pradel, Röthlein, Germany

[73] Assignee: Mannesmann Sachs AG, Schweinfurt, Germany

[21] Appl. No.: 08/965,647

[22] Filed: Nov. 7, 1997

[30] Foreign Application Priority Data

Nov. 13, 1996 [DE] Germany ............................ 196 46 827

[51] Int. Cl.⁶ ...................................................... F16L 5/02
[52] U.S. Cl. ......................... 285/12; 285/136.1; 285/197; 285/201; 188/266.6; 188/322.2
[58] Field of Search .............................. 188/266.6, 322.2, 188/322.21; 285/136.1, 139.1, 139.2, 141.1, 201, 288.1, 204, 205, 211, 379, 12, 197; 215/380

[56] References Cited

U.S. PATENT DOCUMENTS

| | | | |
|---|---|---|---|
| 1,341,165 | 5/1920 | Bryans | 285/136.1 X |
| 1,537,722 | 5/1925 | Winter | 285/205 |
| 2,015,246 | 9/1935 | Taylor | 285/288.1 X |
| 2,782,385 | 2/1957 | Collett | 285/379 X |
| 4,538,835 | 9/1985 | Sundholm | 285/136.1 X |
| 4,702,501 | 10/1987 | McLennan | 285/379 X |
| 5,314,045 | 5/1994 | Fenn et al. | 188/322.21 |
| 5,353,898 | 10/1994 | Handke et al. | 188/322.2 |
| 5,524,938 | 6/1996 | Halder | 285/201 |

FOREIGN PATENT DOCUMENTS

| | | | |
|---|---|---|---|
| 25 26 658 | 12/1975 | Germany | F16L 41/08 |
| 40 14 469 | 11/1991 | Germany | F16L 41/06 |

*Primary Examiner*—Lynne Reichard
*Assistant Examiner*—Greg Binda
*Attorney, Agent, or Firm*—Cohen, Pontani, Lieberman & Pavane

[57] ABSTRACT

The invention relates to a connection device for a liquid or gaseous medium through an outer wall of a cylinder, whereby a connection piece interacts with a bore in the outer wall of the cylinder and with a centering part that is inserted into the bore. The connection piece has a contact surface matched to the cylinder surface and also has a corresponding sealing surface. The connection has an accommodating cavity for receiving an insert, which includes a sealing surface matched to the cylinder surface, The correct installation position of the insert in the accommodating cavity is ensured by an orientation aid.

10 Claims, 6 Drawing Sheets

CONNECTION DEVICE FOR CONNECTING A LIQUID OR GASEOUS MEDIUM THROUGH AN OUTER WALL OF A CYLINDER

BACKGROUND OF THE INVENTION

1. Field of the Invention

The invention relates to a connection device for connecting a liquid or gaseous medium on an outer wall of a cylinder. More specifically, the invention relates a connection device to a hydropneumatic spring cylinder used as a shock absorber for motor vehicles. The connection device interacts with a boring in the outer wall of the cylinder and with a centering part, has a contour matched to the cylinder surface, and also has a corresponding sealing surface, with an elastic sealing ring arranged between the sealing surface and the cylinder surface and is preloaded radially relative to the cylinder.

2. Description of the Related Art

A connection device of this type is known., for example, from DE 40 14 469 A1. In this reference, the connecting piece that interacts with a boring of the cylinder consists of a single piece with a sealing surface and a centering part. Because the contour of the connecting piece is matched to the contour of the cylinder, it is impossible to perform subsequent metal-cutting work on the areas of the connecting piece that interact with the cylinder surface, particularly the sealing surface, at acceptable expense. Thus adjustment of the connecting piece to different or similar cylinder diameters is impossible. As a result, the connecting piece must be produced for only one specific cylinder diameter as a die casting without subsequent processing. Such connecting pieces are suitable only for low pressures, especially when embodied as plastic injection molded parts.

SUMMARY OF THE INVENTION

The object of the present invention is to create a connection device on an outer wall of a cylinder for a gaseous or liquid medium, which is suitable for high pressures, permits simple adjustment to existing cylinder diameters as well as problem-free attachment and sealing, and can be used for a wide variety of applications.

According to the invention, this object is attained by a connection device for insertion into a bore through a cylinder wall which has an accommodating cavity for receiving an insert. The insert includes a sealing surface matched to a surface of the cylinder wall and forms a sealing groove with the cylinder wall surrounding the bore and a centering part which is inserted in the bore. An orientation aid is provided on the insert for ensuring that the insert is installed in the correct position in the accommodating cavity. Such a connection device is simple to adjust to the cylinder surface, for example, by metal-cutting deformation of the contact surface with a plain- or face-milling cutter. In a single work, step, it is possible, in addition to machining the passageway opening, to manufacture the accommodating cavity for the insert. When the centering part comprises a separate part that is connected to the insert prior to the installation of the latter, the insert itself can also be produced as a small and simple component by metal-cutting deformation and subsequent assembly with the centering part. According to the invention, the insert and the centering part can also be designed as a one-piece component; in this case, the one-piece, simple component is produced using a die casting method.

According to a feature of the invention, the centering part is formed by plastic deformation of the cylinder wall when the bore is produced in the outer wall of the cylinder. As a result, a collar is created that, as described above, permits the insert to be processed simply, without any subsequent assembly with the centering part.

In one embodiment of the invention, the connection device is attached to the cylinder wall simply and economically, because the connection device is a forged part and has a welded flange running in the circumferential direction of the cylinder. The connection device is thus welded to the cylinder without disadvantageously affecting the elastic sealing ring. In addition, a connection device produced in this manner and attached to the cylinder by welding is suitable for absolute impermeability even at very high pressures. Other types of attachment devices are also possible for the connection device that exercise a pressure force acting in the radial direction. For example, it it possible to use a fixing cap, a pipe clamp or a steel attachment strip.

To maintain the correct position of the curved sealing surface of the insert in the connection, an orientation aid is provided. The orientation aid is preferably formed by a small cylindrical projection on the insert, which engages into a small slot or cut-out in the connection device. As a result, the sealina surface is precisely positioned relative to the contact surface to achieve a perfect sealing effect. The insert can be manufactured from a wide variety of materials, because it essentially must absorb only pressure forces. The insert can be pressed or driven into the accommodating cavity or, if metal materials are used, soldered in.

The connection device is suitable for a wide variety of applications. The invention can be embodied as an angled connection piece with attachment, which preferably runs parallel to the cylinder axis, for a collecting hose or a connecting line; this attachment can consist, for example, of a receptacle or a connecting thread. It is also easily possible for the connection to be arranged between the cylinder and a container, with the connection device preferably embodied in single piece with the container, whereby the container carrying the connection device includes the welded flange. This makes it possible for the compensation space in, for example, a single-tube vibration damper to be formed by the container, so that the vibration damper has a short structural length. It is also advantageous, in the connection device according to the invention, that the container is arranged very close to the hydraulic or pneumatic connecting means.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

Preferred examples of the invention are described in greater detail below in reference to the drawings. The drawings show.

DETAILED DESCRIPTION OF THE PRESENTLY PREFERRED EMBODIMENTS

Figure 1:
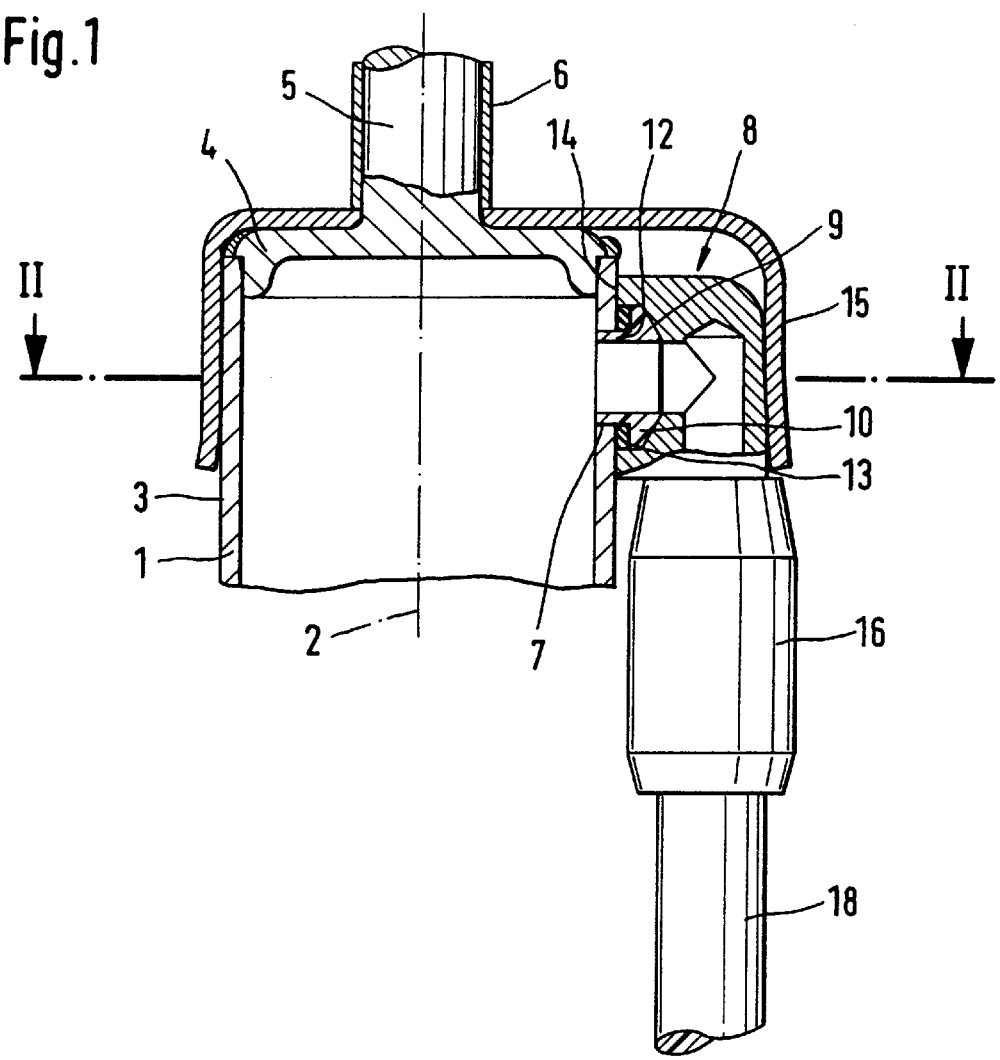
FIG. 1 is a longitudinal sectional view showing a connection device of the present invention designed as a connecting piece on a cylinder.
Figure 2:
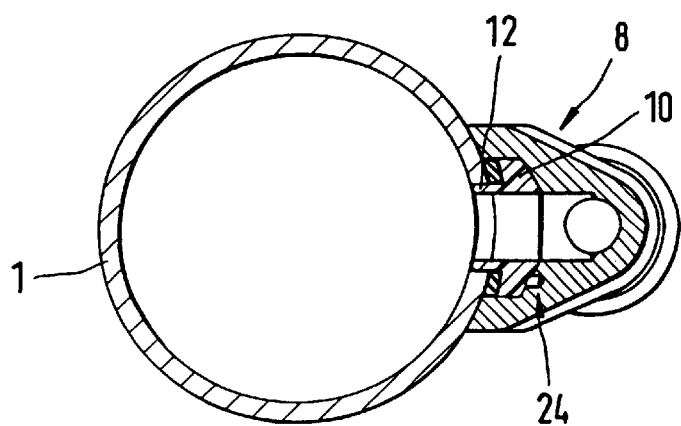
FIG. 2 shows a cross-section through the connection device along section line II—II in FIG. 1.
Figure 3:
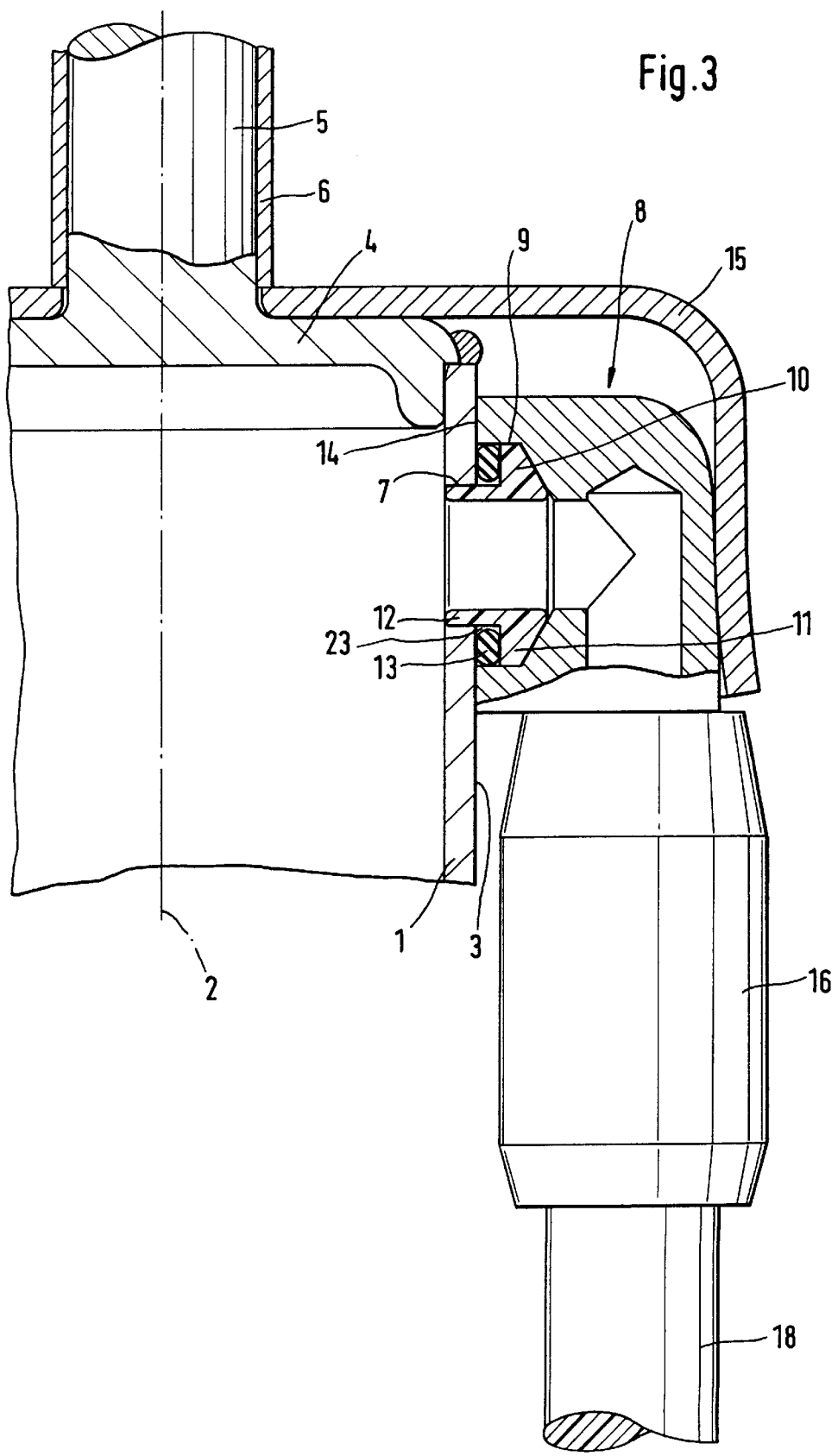
FIG. 3 shows an enlarged view of the section of the connection device in FIG. 1.

Referring to FIGS. 1 through 6, a cylinder 1 having a longitudinal axis 2 is sealed in a pressure-tight manner with a cylinder lid 4. The cylinder lid 4 includes an articulated pin 5 forming part of a shock absorber in a vehicle when the cylinder 1 is installed and acts between the vehicle body and a wheel location part. For hydraulic or pneumatic connection of a connection piece 8 to the working area of the cylinder 1, a bore 7 is located in the cylinder. A centering part 12 connected to the connection piece 8 engages the bore 7. This centering part 12 is designed as a single piece with an insert 10, which is received in a simply-produced accommodating cavity 9 in the connection piece 8. A sealing surface 1 1 of the insert 10 points toward the cylinder 1 and runs parallel to the cylinder surface 3. The sealing surface forms a sealing groove 23 with the wall of the accommodating cavity 9 and the centering part 12 in which an elastic sealing ring 13 is inserted (shown especially clearly in FIG. 3). The connection piece 8 includes a contact surface 14 facing the cylinder 1 that is matched exactly to the cylinder surface 3 and can be easily produced, for example, by means of a plain milling cutter that has an outer diameter corresponding to the cylinder 1. When used as a high-pressure connection, the body of the connection 8 is produced as a forging, while the accommodating cavity 9 is machined in metal-cutting fashion together with the passageway bore 7 and the contact surface 14. To radially press the connection piece $ toward the cylinder surface 3, a pressing device, such as a fixing cap 15, is provided. The fixing cap 15 is pressed by a supporting piece 6, which interacts with an articulation screw connection, against the outer face of the cylinder lid 4 and outwardly overlaps the connection piece 8. The contact surface 14 is therefore pressed against the cylinder surface 3 and, as a result, the elastic sealing ring 13 in the sealing groove 23, is pressed against the sealing surface 11 of the insert 10 as well as against the cylinder surface 3. The sealing ring is an O-ring in the preferred embodiment but can be any shape or form as long as it provides a seal.

Instead of the fixing cap 15, a pipe clamp or a steel attachment strip can also be used as the pressing device for pressing the connection piece 8 against the outer wall of the cylinder 1 and squeezing the sealing ring between the outer wall of the cylinder 1 and the sealing surface 11 of the insert 10.

An orientation aid 24 is provided to ensure the correct insertion position of the insert 10 in the accommodating cavity 9 of the connector piece 8. In the present example, the orientation aid comprises a small slot 22 in the connector piece 8 body which engages a cylindrical projection 21 on the insert 10. The insert 10 is manufactured from a wide variety of materials, depending on the requirements placed on the connection piece 8. It is also easily possible to produce the centering part 12 as a separate component and to connect the centering part to the insert only after the sealing surface 11 has been produced on the insert 10 by metal-cutting deformation, for example. Depending on the material used, the insert 10 can be pressed, adhered or soldered into the connection piece 8.

Figure 4:
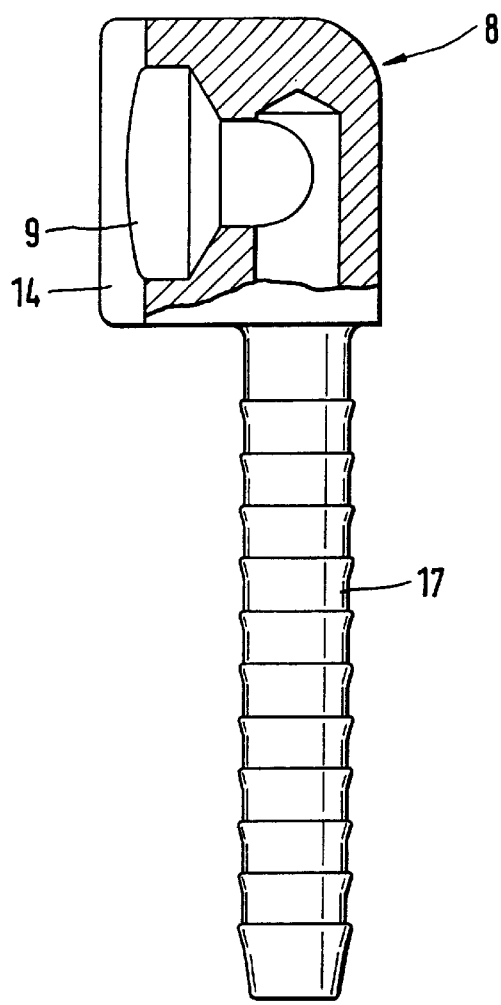
FIG. 4 shows a partial longitudinal section of the body of the connecting piece of the connection device in FIGS. 1 to 3.
Figure 5:
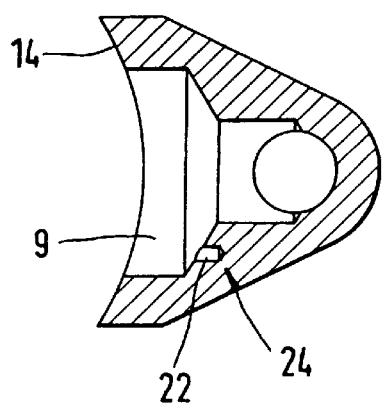
FIG. 5 shows a cross-sectional view of the connecting piece shown in FIG. 4 along line V—V.
Figure 6:
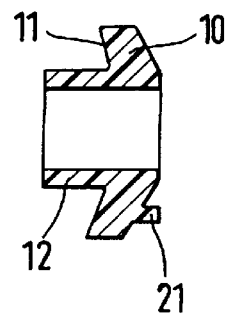
FIG. 6 shows an insert for the connecting piece of FIGS. 4 and 5.
Figure 7:
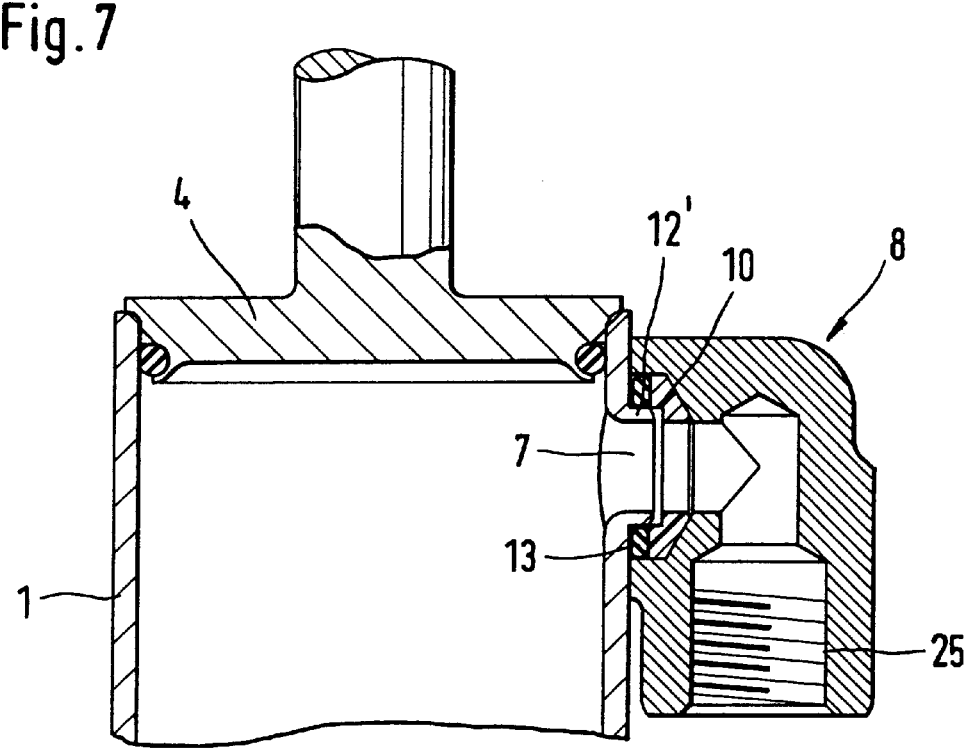
FIG. 7 is a longitudinal sectional view of another embodiment of the connection device of the present invention with a centering part formed on the cylinder.
Figure 8:
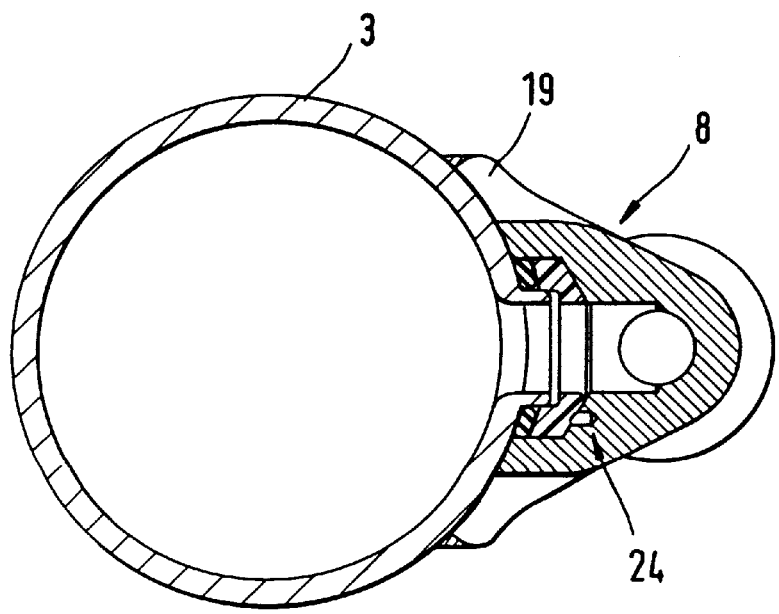
FIG. 8 is a cross-section view through line VIII—VIII in FIG. 7.
Figure 9:
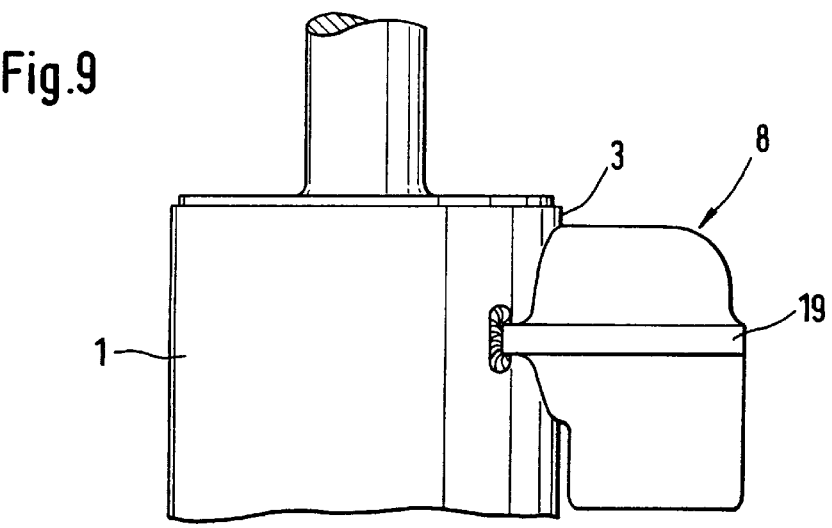
FIG. 9 shows a side view of the connection device in FIGS. 7 and 8.
Figure 10:
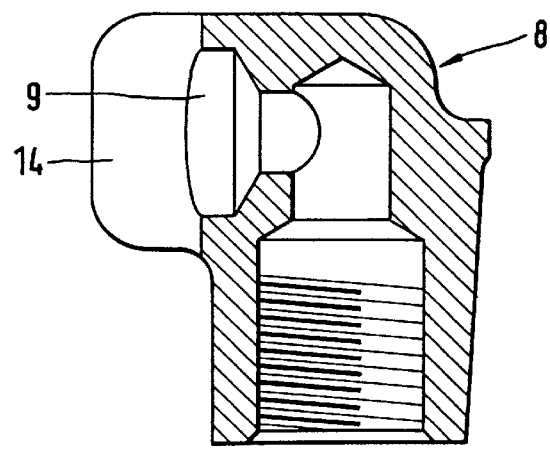
FIG. 10 is an enlarged view of the connecting piece according to FIG. 7.
Figure 11:
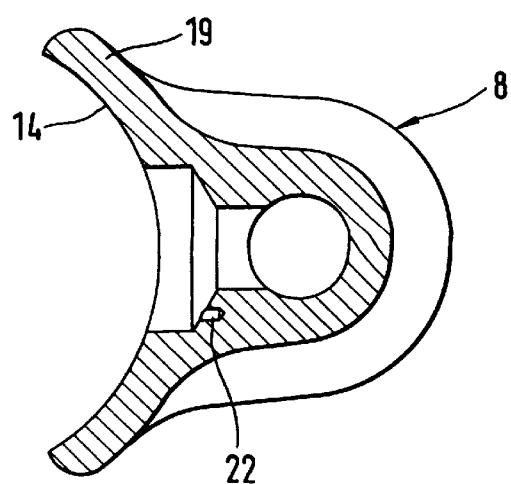
FIG. 11 is a cross-section view through line XI—XI in FIG. 10.

Referring to FIG. 4, a receptacle 17 is provided on the connection piece 8 for connecting the connection piece 8 to a connecting hose 18. The connecting hose 18 is inserted through the receptacle 17 and connected securely to a hose band 16. The connecting hose 18 must compensate elastically for relative movements between the axle and the vehicle body, whereby the hoses may be curved but not twisted. It is thus necessary, in such applications, for the connecting hose 18 to be connected parallel to an axis of the cylinder 1 and only then curved away in the direction of the hose receptacle of the vehicle body. As shown in FIG. 4, the connection piece 8 is an angled connection piece in that the receptacle 17 is arranged at an angle to the axis of the bore 7. In the present embodiment, the receptable 17 is arranged at approximately a right angle to the bore 7.

Another embodiment of the invention is shown in FIGS. 7 to 11. In the cylinder 1, the bore 7 is created by plastic deformation. The centering part 12' is formed simultaneously during the elastic deformation. The insert 10 in the connection piece 8 is thus more simply designed. This makes the insert 10 easier to manufacture and precisely matched to the cylinder surface 3 by metal-cutting deformation. In this embodiment, the connecting hose or a connecting line can be attached to connection piece 8 by a connecting thread 25 (see FIG. 7). The attachment of the connection piece 8 to the cylinder 1 is also different from the first embodiment described above. In this embodiment, the connection piece 8 includes a welded flange 19 extending in a circumferential direction with respect to the cylinder 1, on both sides of the bore 7 thereby permitting a welded connection to be made to the cylinder 1 without thermal damage to the sealing ring 13.

Figure 12:
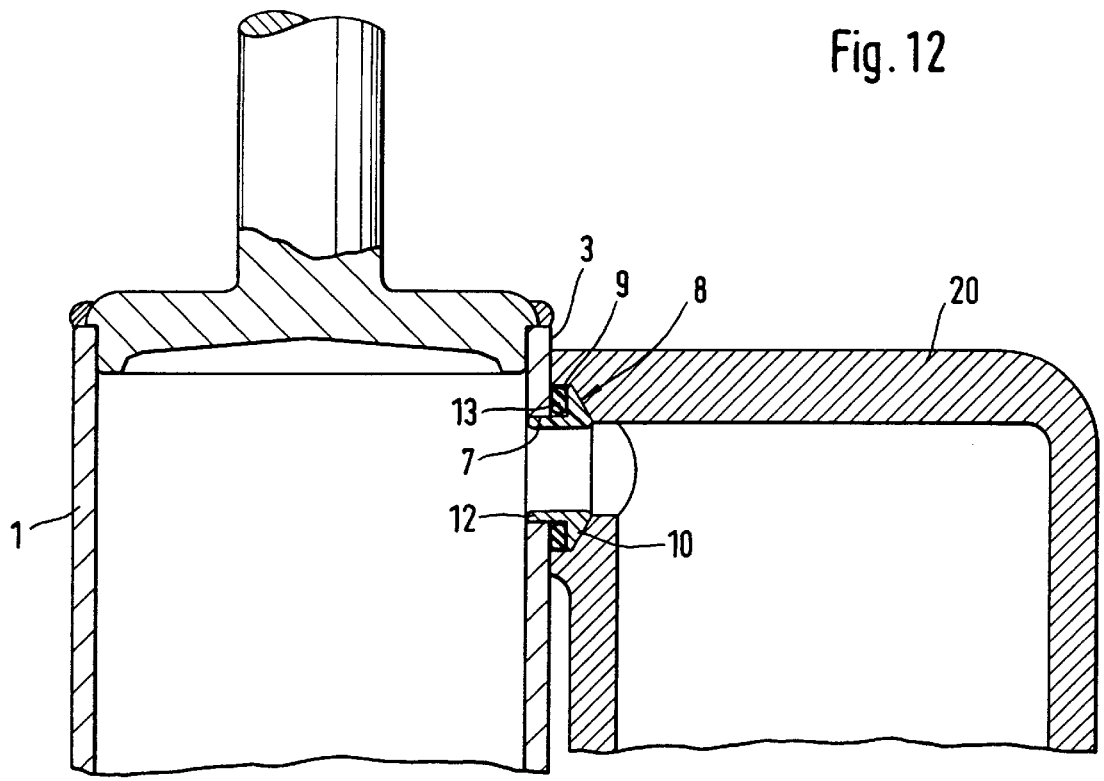
FIG. 12 shows a longitudinal view of an embodiment of the connection device of the invention arranged for pressure-tight connection of the cylinder to a container.
Figure 13:
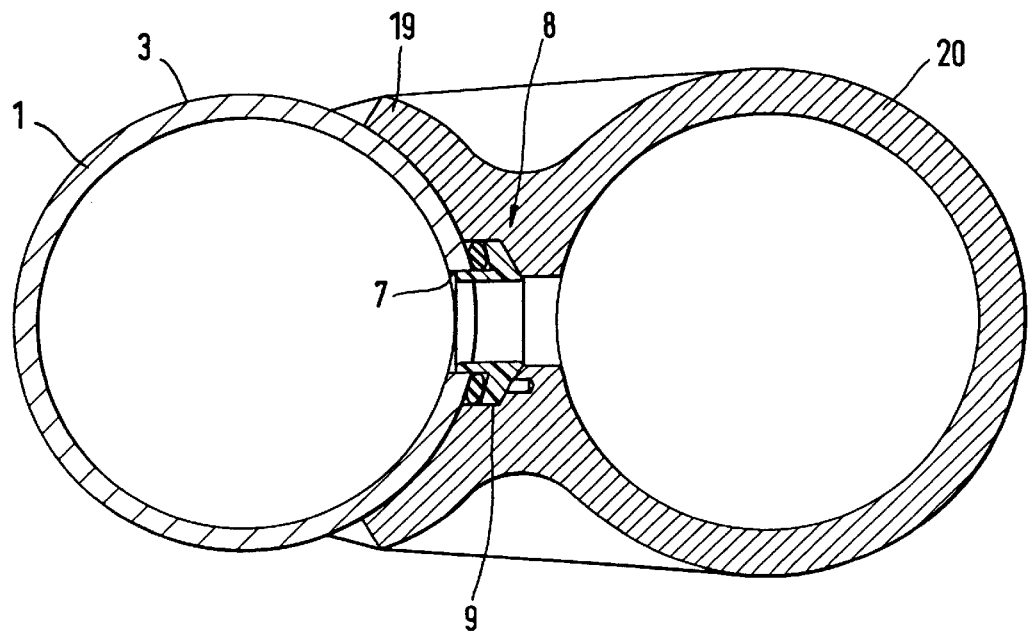
FIG. 13 shows a cross-sectional view of the connection device through line XIII—XIII in FIG. 12.

According to FIGS. 12 and 13, the connection piece 8 of the present invention also enables a simple hydraulic or pneumatic connection of the cylinder 1 to a container 20. The connection piece 8 is formed by an accommodating cavity 9' in the container 20. In this embodiment, the insert 10, with the centering part 12 and the sealing ring 13, is received in acommodating cavity 9'. FIG. 13 shows that a connecting flange 19 extends circumferentially or both sides of the boring 7 on the cylinder 1 and is welded to the latter. This design creates a hydraulic or pneumatic connection of a container 20 that rests very closely on the cylinder 1. The close proximity of the container to the cylinder is highly advantageous, especially in single-tube vibration dampers, because the compensation area is formed by the container 20 and high-pressure vibration dampers of this kind can be as short axially as vibration dampers of the double-tube type.

The connection device according to the invention is applicable for all conceivable uses of a hydraulic cylinder, a cylindrical container or a conduit with a supply or discharge of a liquid or gaseous medium. Unrestricted connections at several locations on a cylinder can also be realized.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A connection device for connecting a liquid or gaseous medium on an outer wall of a cylinder, wherein the connection device interacts with a bore in the outer wall of the cylinder, the connection device comprising:

a connection piece including a cavity;

an insert for insertion into the cavity of the connection piece, the insert having a sealing surface with a contour matching a contour of the outer wall of the cylinder surrounding the bore, and having an orientation aid operatively arranged for ensuring a correct installation position of said insert in the cavity of said connection piece;

a centering part extending through the bore in the outer wall of the cylinder;

the sealing surface of said insert, said centering part, and the cavity forming a sealing groove adjacent the outer wall of the cylinder; and a sealing ring positioned in the sealing groove between the outer wall of the cylinder and the sealing surface of the insert.

2. The connection device of claim 1, wherein the centering part comprises a tubular shape and comprises an integral part of said insert.

3. The connection device of claim 1, wherein the centering part comprises an integral part of the outer wall of the cylinder formed by plastic deformation of the outer wall during a formation of the bore in the outer wall of the cylinder.

4. The connection device of claim 1, wherein the connection piece comprises a forged material having a flange extending in the circumferential direction of the cylinder on either side of the bore and welded to the outer wall of the cylinder.

5. The connection device of claim 1, wherein the connection piece is operatively connectable to an external pressure device for applying a radial contact force against the outer wall of the cylinder thereby preloading said sealing ring and pressing a contact surface of the connecting piece onto the outer wall of the cylinder.

6. The connection device of claim 5, wherein said external pressure device comprises a device consisting of one of a fixing cap, a pipe clamp, and a steel attachment strip.

7. The connection device of claim 1, wherein the orientation aid comprises a projection and a recess, wherein one of the projection and the recess is operatively mounted on said insert and the other one of the projection and the recess is operatively mounted on the connection piece, whereby said projection engages said recess for correctly positioning said insert in the connection piece.

8. The connection device of claim 1, wherein said connection piece comprises an angled connection piece having an attachment consisting of one of a receptacle and a connecting thread and running parallel to an axis of the cylinder for receiving a connection element consisting of one of a connecting hose and a connecting conduit.

9. The connection device of claim 1, further comprising a container:

said connection piece operatively connected between the cylinder and the container; and said connection piece comprising an integral part of the container.

10. The connection device of claim 9, wherein the container comprises flanges which extend circumferentially with respect to the outer wall of the cylinder and are welded thereto.

* * * * *